United States Patent [19]

Benscoter

[11] 4,163,572
[45] Aug. 7, 1979

[54] TRANSITION FITTING
[75] Inventor: Richard D. Benscoter, Parkersburg, W. Va.
[73] Assignee: Textron Inc., Providence, R.I.
[21] Appl. No.: 848,804
[22] Filed: Nov. 7, 1977
[51] Int. Cl.² .............................................. F16L 55/00
[52] U.S. Cl. ..................................... 285/121; 174/48; 174/72 L; 285/150; 285/424; 138/89; 403/191; 403/235
[58] Field of Search ..................... 285/121, 424, 150; 174/48, 49, 68 C, 71 R, 71 L, 72 R, 72 L, 101; 29/525; 138/107, 116, 158, 162, 89; 403/191, 233, 235

[56] References Cited
U.S. PATENT DOCUMENTS
917,328  4/1909  Lutz ..................................... 285/121
1,094,109  4/1914  Alpaugh ............................... 174/68 C
2,740,429  4/1956  Parks .................................... 285/424 X
3,023,032  2/1962  Johnston et al. .................. 285/424 X
3,603,625  9/1971  Cottrell ............................... 174/72 R
3,867,045  2/1975  Beals .................................... 403/235

FOREIGN PATENT DOCUMENTS
476871  12/1937  United Kingdom ..................... 285/424
549840  12/1942  United Kingdom ..................... 285/424

Primary Examiner—Dave W. Arola
Attorney, Agent, or Firm—Frederick J. Olsson

[57] ABSTRACT

A pair of self-clamping couplings are secured to the opposite walls of a feeder duct. The ends of a pair of branch ducts are respectively supported on the couplings. A cover closes off the space between the branch ducts and is held in position by engagement with the ends of the branch ducts.

5 Claims, 6 Drawing Figures

TRANSITION FITTING

This invention relates to overhead or above the ceiling raceway systems for power and communication distribution in buildings and the like.

More particularly, the invention relates to transition means for transferring power and communication wires from main or feeder ducts to branch ducts.

The invention contemplates transition means comprising a pair of self clamping branch duct couplings each of which can be respectively fixed to the opposite sides of the feeder duct simply by turning a screw and which have platform sections respectively supporting the opposite ends of the branch ducts with the bottoms of the branch ducts at the top of the feeder duct, together with a cover which closes off the space between branch ducts and fits down over and engages the ends of the branch ducts and is securely held by such engagement.

Among the advantages of the invention are:
(a) speed of installation.
(b) safe against accidental dislogement once installed.
(c) branch runs can be located at any position along the feeder without modification.
(d) branch runs can be relocated without modification.
(e) the transition is made at the top of the feeder run directly into the branch run so that there is only one radius to negotiate.
(f) minimum number of parts to fabricate and handle at installation.
(g) inventory requirements kept to a minimum.
(h) no custom fabrication for different systems.

The invention will be explained below in connection with the following drawings wherein.

Figure 1:
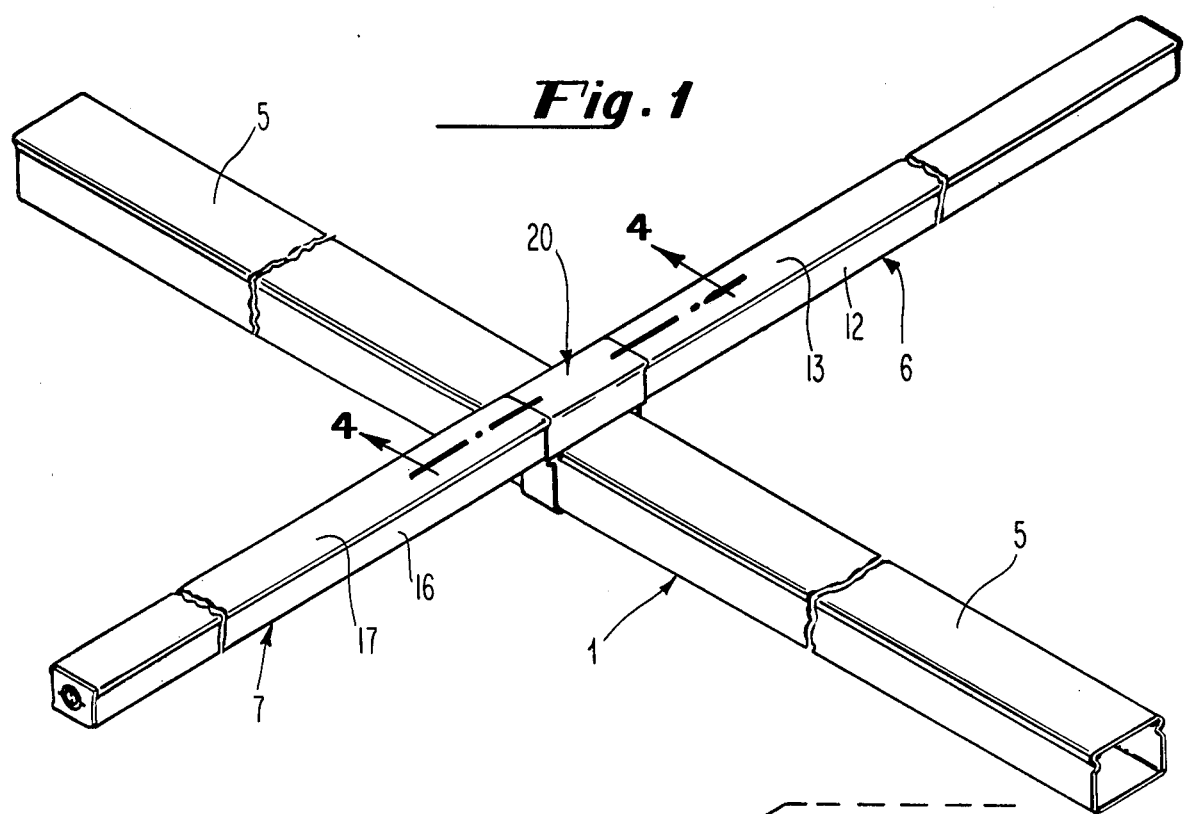
FIG. 1 is a perspective view of part of an overhead raceway system having a feeder duct and branch ducts on opposite sides of the feeder and transition means at the juncture of the ducts.
Figure 2:
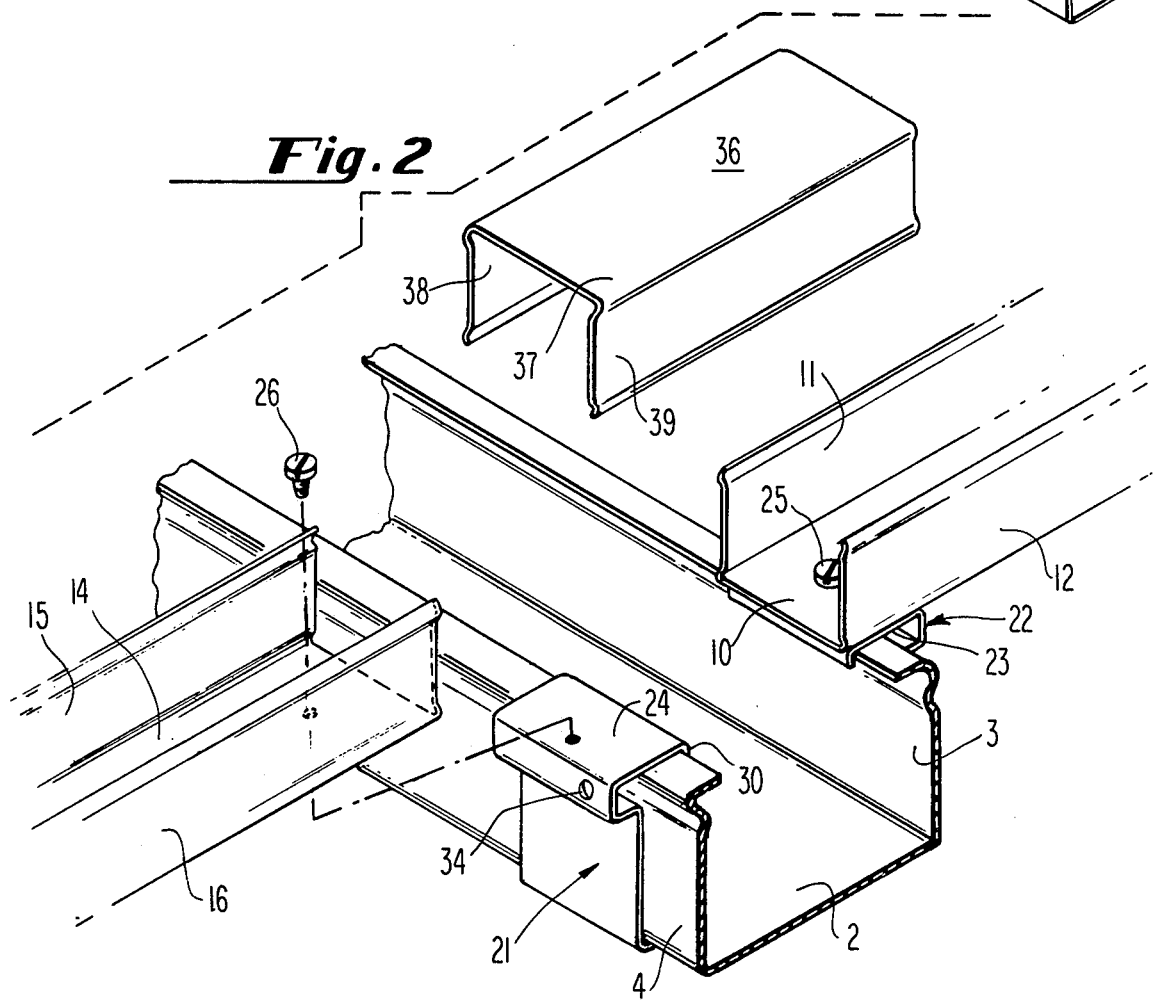
FIG. 2 is a fragmentary exploded view of the transition means of FIG. 1.

In FIG. 1 a main or feeder duct is indicated at 1. Referring to FIG. 2, duct is channel shaped having a bottom 2 and side walls 3 and 4. One or more snap-on removable covers 5 extend across the open mouth of the channel. A pair of ducts which feed branch circuits are indicated at 6 and 7. The branch duct 6 is channel shaped having a bottom 10 and side walls 11 and 12 and snap-on cover 13. The branch duct 7 is also channel shaped and has a bottom 14 and side walls 15 and 16 and snap-on cover 17.

The feeder duct 1 is adapted to carry power or communication conductors. These are transfered to the appropriate branch duct by the transition means or fitting indicated at 20.

While I have shown the system configuration to comprise one feeder duct and a pair of opposite branch ducts which are supplied from the same point along the feeder, it will be understood that the job specifications vary widely and there are many, many different kinds of feeder/branch duct arrangements in any one system. For example, an installation may require a pair of side-by-side feeder ducts one carrying power conductors and the other communication conductors which independently feed several pairs of branch ducts or single ducts or combinations of same spaced along the length of the feeder.

With regard to the wide variety of systems aspect, the invention is especially important as it may be readily employed without modification and this feature eliminates necessity of large inventory of parts to meet different conditions or custom fabrication.

Figure 3:
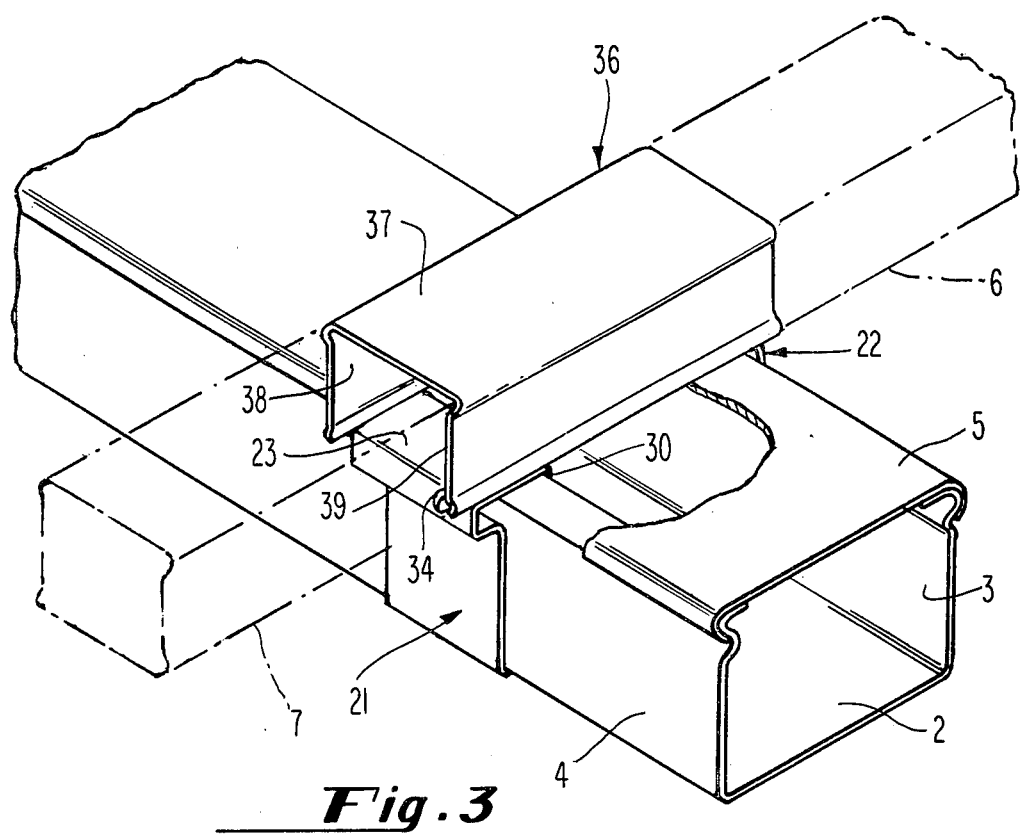
FIG. 3 is a fragmentary perspective view of the transition means of FIG. 1 in assembled condition.
Figure 4:
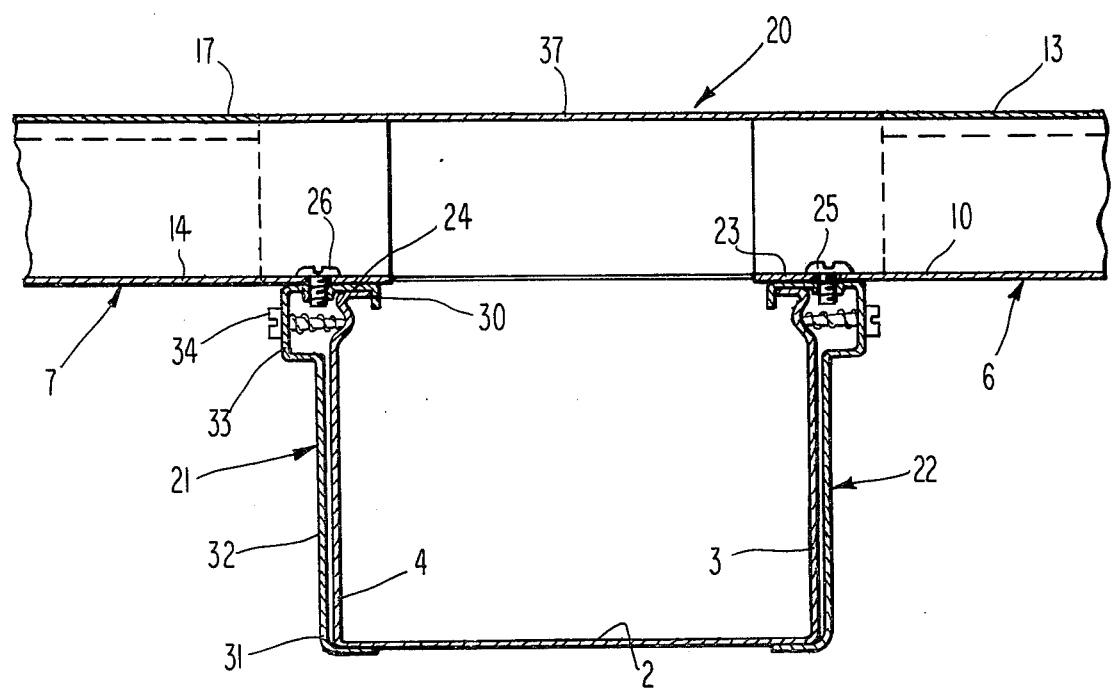
FIG. 4 is a view taken along the lines 4—4 of FIG. 1.

The details of the transition means will be explained in connection with FIGS. 2, 3 and 4. Referring first to FIG. 2 it will be seen that the feeder duct 1 and the branch duct 6 and 7 are shown with their snap-on covers removed and with the duct 7 disconnected. This has been done for the sake of clarity in this exploded view.

Important components of the transition means are the couplings 21 and 33 clamped to the walls 3 and 4. The couplings are identical and the cross sectional shape is best indicated in FIG. 4. The couplings have flat platform sections 23 and 24 which rest on the top edges of the walls 3 and 4 and support the ducts 6 and 7. The bottom 10 of the duct 6 rests on the platform 23 while the bottom 14 of the duct 7 rests on the platform 24. The ducts are held to the platform sections by the screws 25 and 26.

Each coupling has clamp means by which it is secured to the wall of the feeder. Referring to coupling 21, the clamp means includes a flange 30 on the inner edge of the platform 24 which extends down into the feeder and engages the inside top edge of the wall 4, a foot section 31 which extends down under the bottom 2 of the feeder together with an intermediate or leg section 32 which extends from the outer edge of the platform 24 down to the foot section 31. The leg also includes the knee section 33. A screw 34 is threaded in the knee and bears on the off-set 35 at the top of wall 4.

The coupling structure provides that it can be clamped to either wall of the feeder duct and this is important from the standpoint of inventory reduction.

A coupling is mounted as explained in connection with coupling 21.

With the branch ducts 6 and 7 disconnected, the flange 30 is hooked over the top of wall 4 and then the coupling rotated down (counter clockwise in FIG. 4) so that the foot section 31 extends under the bottom 2 of the feeder duct. The screw 34 is then turned in or tightened up. This, in effect, causes the coupling to rotate counter-clockwise, so that the flange 30 tightly engages the inside of the top of the wall 4 and the foot section 31 moves in to tightly engage the lower part of the wall 4 and the bottom 2 of the feeder.

It will be readily apparent that the couplings can be installed at any place along the feeder and that the same can be easily removed and reinstalled at some other point without any compensating modification.

After the couplings are installed at the desired location, the branch ducts are secured as previously described. It will be noted particularly with reference to FIG. 4 that the bottoms 10 and 14 of the branch ducts are located precisely at the top of the feeder duct. Thus, conductors or cables in the feeder duct coming up into the branch ducts have only one radius to negotiate. This is especially important from the standpoint of communication conductors, as these are often times relatively bulky and have a small bending radius.

The transition means is completed by installing the cover 36 which closes off the space between the branch ducts. As noted, the cover is U-shaped having a top 37 and side walls 38 and 39. The length of the transition cover is somewhat greater than the distance between the outer edges of the platfrom sections of the couplings. In this way, the cover can be pushed down over the ducts 6 and 7 so that the outer portions or opposite ends of the cover walls extend over and engage the walls of the branch ducts. When the cover is fully down as in FIGS. 1 and 3, the outer edges of the walls 38 and 39 engage the platform sections.

The parts are dimensioned so that the engagement between the cover walls and duct walls maintains the cover securely in position. The cover of course can be removed by prying off.

When the transition cover 36 and the feeder duct covers 5 and the branch duct covers 13 and 17 are installed, the lower edges of the walls 38 and 39 of the transition cover abut or are closely adjacent to the edges of the feeder duct covers 5 and the edges of the top 37 of the transition cover either abut or are closely adjacent the branch duct covers 13 and 17. The foregoing relationship is generally shown in FIG. 1.

In some applications only a single branch run will be taken off at one point along the feeder duct. In such cases, the opposite end of the cover must be closed off. There are alternative arrangements for accomplishing this as will be explained in connection with FIG. 5. As shown, the feeder 1 supports the branch duct 6 with the duct 7 being eliminated.

Figure 5:
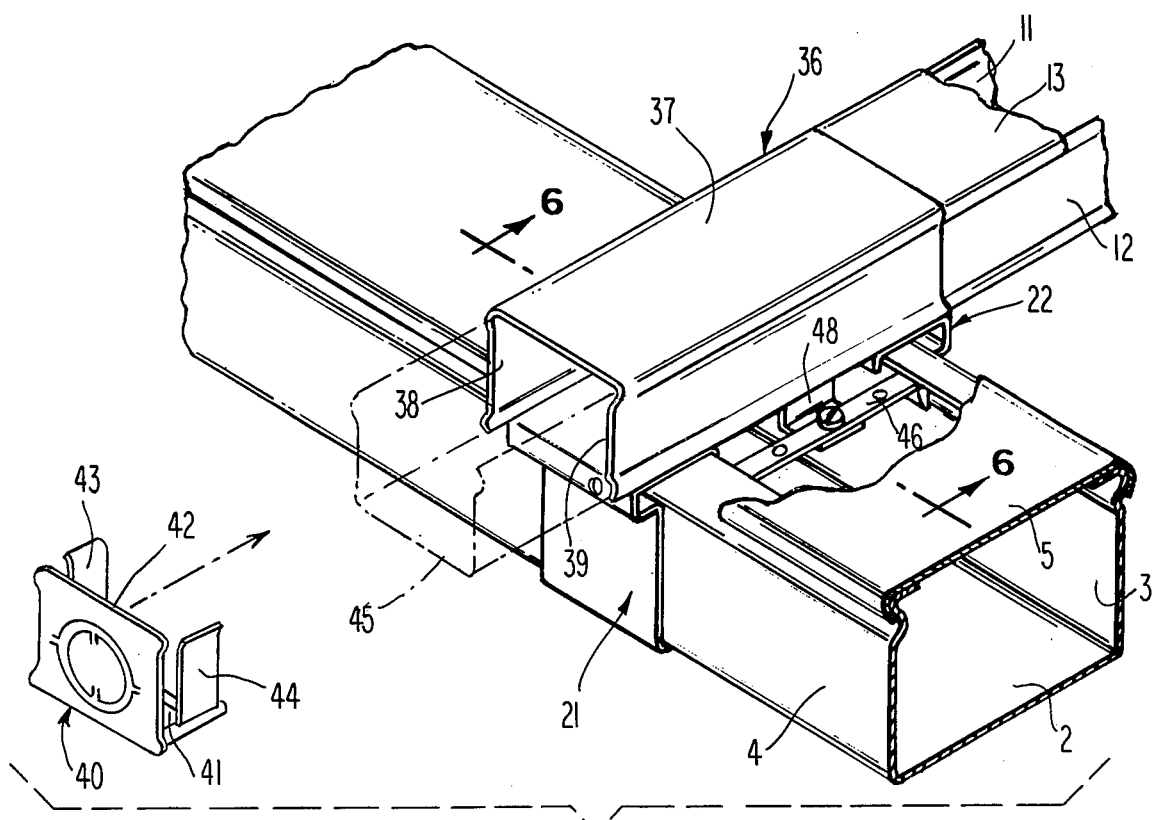
FIG. 5 is a fragmentary view similar to FIG. 3 and illustrating a single branch duct from the feeder and alternative ways of closing off the transition means and of locking the transition cover in place.

The transfer area of FIG. 5 is assembled as follows: First, the couplings 21 and 22 are secured in place and then the duct 6 is connected to the platform section 23. Next an end cap 40 which has a bottom 41, a closure wall 42 and side walls 43 and 44 is mounted on the platform section 24 of the coupling 21 and screwed down similarly as the duct 7. The cover 35 is then placed down over the duct 6 and the cap 40. Walls 38 and 39 of the cover engage the walls 11 and 12 of the duct 6 and walls 43 and 44 of the cap. The periphery of the closure wall 42 fits closely within the top and side walls of the cover and is substantially flush to the cover edge.

At some instances the closure is made by employing a short section of branch duct in combination with an end cap. In such instances, a short section of branch as indicated by the dotted lines 45 is secured to the platform section 24. Then the end cap 40 is reversed in position 180° as shown is inserted into the end of the short section 44. It is held in position by a screw thru the short section cover and threaded into the bottom 41.

Figure 6:
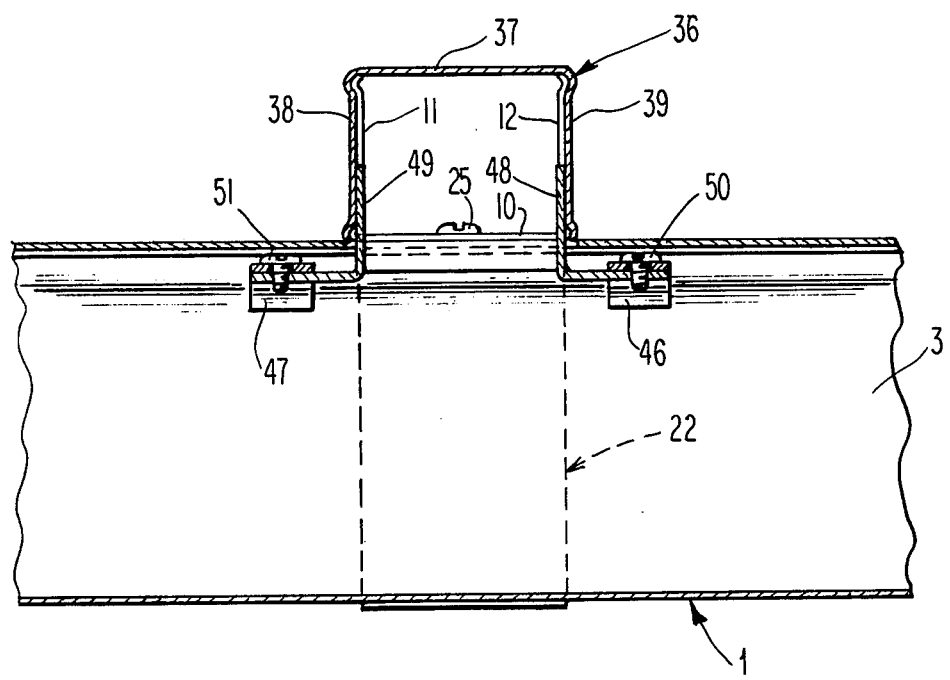
FIG. 6 is a view taken along the lines 6—6 of FIG. 5.

In other applications, it may be desirable to provide additional means for securing the cover 35 in position. An arrangement for accomplishing this is shown in FIGS. 5 and 6. This comprises a pair of bridges connected to the feeder duct and a pair of angles on the cover which are joined to the bridges by screws. Thus, the bridges 46 and 47 have their opposite ends appropriately contoured so as to fit into the off-set sections of the feeder duct walls as shown. The bridges are slidable along the feeder. The cover 35 has angles 48 and 49. When the cover is in position, as shown in FIG. 5, these angles fit underneath the bridges. The screws 50 and 51 fasten the bridges and angles together.

I claim:

1. In an overhead raceway system having a feeder duct and a pair of transverse branch ducts, each duct being channel shaped with a removable cover across the channel opening, improved transition means for the transfer of power/communication conductors from the feeder duct to the branch ducts comprising:
   a first branch duct coupling having clamp means engaging the inside and the outside of one wall of the feeder duct and a screw threaded in the clamp means and engaging the outside of said one wall of the feeder duct, the screw being turned in to cause said engagement of the clamp means to secure the coupling in position and the coupling having a platform section supporting one of the branch ducts with the bottom of said one duct at the top of the feeder duct;
   a screw securing the bottom of said one branch duct to said platform section;
   a second branch duct coupling having clamp means engaging the inside and the outside of the other wall of the feeder duct and a screw threaded in the clamp means and engaging the outside of said other wall of the feeder duct, the screw being turned in to cause said engagement of the clamp means to secure the coupling in position and the coupling having a platform section supporting the other branch duct with the bottom of the other branch duct at the top of the feeder duct;
   a screw securing the bottom of said other branch duct to the last said platform section; and
   a channel shaped cover extending between the branch ducts and being removably secured thereto by that the opposite ends of the cover walls extend over and engage the walls of the respective branch ducts.

2. The transition means of claim 1 wherein each said clamp means includes a portion extending along the wall of the feeder duct and under the bottom of the feeder duct.

3. The transition means of claim 1 further including a pair of bridges disposed adjacent the top of the feeder duct respectively adjacent the outer edges of the walls of the cover, a pair of angles respectively secured to the wall of the cover and being disposed adjacent said bridges and a pair of screws respectively connecting the adjacent angles and bridges and for each bridge, means operatively connected between the bridge and the walls of the feeder duct securing the bridge to the feeder duct.

4. In an overhead raceway system having a feeder duct and a transverse branch duct, each duct being channel shaped with a removable cover across the channel opening, improved transition means for the transfer of power/communication conductors from the feeder duct to the branch duct comprising;
   a first branch duct coupling having clamp means engaging the inside and the outside of one wall of the feeder duct and a screw threaded in the clamp means and engaging the outside of said one wall of the feeder duct, the screw being turned in to cause said engagement of the clamp means to secure the coupling in position and the coupling having a platform section supporting said branch duct with the bottom of the branch duct at the top of the feeder duct;
   a screw securing the bottom of said branch duct to said platform section;

an end cap including a bottom, a closure wall and a pair of side walls extending up from the bottom thereof;

a second branch duct coupling having clamp means engaging the inside and the outside of the other wall of the feeder duct and a screw threaded in the clamp means and engaging the outside of said other wall of the feeder duct, the screw being turned in to cause said engagement of the clamp means to secure the coupling in position and the coupling having a platform section mounting the bottom of said end cap;

a screw securing the bottom of the end cap to said platform section;

a channel shaped cover extending between the branch duct and said closure wall and being removable secured to the branch duct and end cap by that the opposite ends of the cover walls extend over and engage the walls of the branch duct and the end cap.

5. In an overhead raceway system having a feeder duct and a transverse branch duct, each being channel shaped with a removable cover across the channel opening, improved transition means for the transfer of power/communication conductors from the feeder to the branch duct comprising;

a first branch duct coupling having clamp means engaging the inside and the outside of one wall of feeder duct and a screw threaded in the clamp means and engaging the outside of said one wall of the feeder duct, the screw being turned in to cause said engagement of the clamp means to secure the coupling in position and the coupling having a platform section supporting said branch duct with the bottom of the branch duct at the top of the feeder duct;

a screw securing the bottom of said branch duct to said platform section;

a closure duct, channel shaped in cross section and having a removable cover across its channel opening;

an end cap disposed at one end of the closure duct;

a second branch duct coupling having clamp means engaging the inside and the outside of the other wall of the feeder duct and a screw threaded in the clamp means and engaging the outside of said other wall of the feeder duct, the screw being turned in to cause said engagement of the clamp means to secure the coupling in position and the coupling having a platform section mounting the bottom of said closure duct;

a screw securing the bottom of the closure duct to said platform section;

a channel shaped cover extending between the branch duct and the closure duct and being removable secured thereto by that the opposite ends of the cover walls extend over and engage the walls of the branch duct and the closure duct.

* * * * *